United States Patent [19]

Holzman

[11] 4,124,976
[45] Nov. 14, 1978

[54] METHOD FOR REDUCING THE CRITICAL INJECTION PARAMETER IN A SOLID FUEL RAMJET

[75] Inventor: Allen L. Holzman, Palo Alto, Calif.

[73] Assignee: The United States of America as represented by the Secretary of the Navy, Washington, D.C.

[21] Appl. No.: 813,044

[22] Filed: Jul. 5, 1977

Related U.S. Application Data

[63] Continuation-in-part of Ser. No. 702,388, Jul. 6, 1976, abandoned.

[51] Int. Cl.² ............................ F02K 9/04; F02K 9/06
[52] U.S. Cl. ........................................ 60/204; 60/251; 60/253; 60/270 S
[58] Field of Search ................. 60/204, 251, 253, 256, 60/270.5

[56] References Cited

U.S. PATENT DOCUMENTS

| | | | |
|---|---|---|---|
| 3,370,430 | 2/1968 | Davies | 60/251 |
| 3,430,445 | 3/1969 | Smith | 60/245 |
| 3,626,697 | 12/1971 | Nunn et al. | 60/204 |
| 3,668,872 | 6/1972 | Camp et al. | 60/251 |
| 3,754,511 | 8/1973 | Damon et al. | 102/102 |
| 4,031,698 | 6/1977 | Humphrey et al. | 60/270.5 |

*Primary Examiner*—Robert E. Garrett
*Attorney, Agent, or Firm*—R. S. Sciascia; Roy Miller

[57] ABSTRACT

A method and system for reducing the critical injection parameter ($h/D_p$) in a solid fuel ramjet (SFRJ) by using a low $h/D_p$ fuel within the recirculation region of the grain and a higher $h/D_p$ fuel for the majority of the grain to reduce the injector pressure drop, allow higher chamber pressure and higher performance and achieve flame stabilization.

6 Claims, 1 Drawing Figure

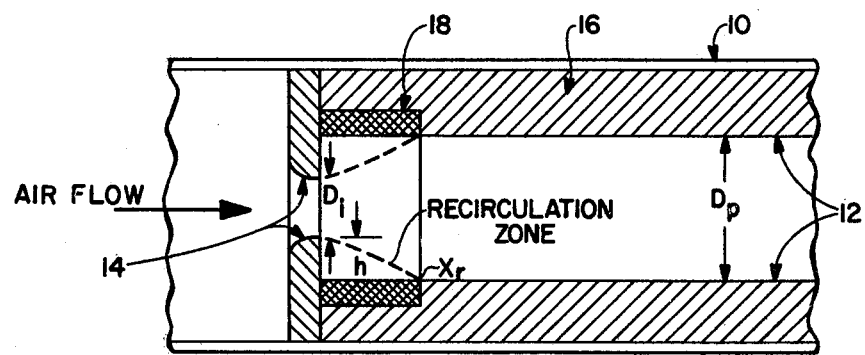

METHOD FOR REDUCING THE CRITICAL INJECTION PARAMETER IN A SOLID FUEL RAMJET

CROSS REFERENCE TO RELATED APPLICATIONS

This application is a continuation-in-part of application Ser. No. 702,388, filed July 6, 1976, now abandoned.

BACKGROUND OF THE INVENTION

Early efforts to burn solid hydrocarbons in the ramjet mode encountered difficulties in reliable flame holding. Ramjet technology, using oxidizer-free solid fuels, developed rapidly after the role of the sudden expansion flame holder as a reliable method of flame stabilization for SFRJ's was recognized.

At first, it might appear that the application of the sudden expansion flame holder to SFRJ's represents no new technology since the technique has been used successfully for many years in liquid ramjet combustors.

However, a major difference exists between the two systems. In the liquid ramjet, fuel and air are premixed to the desired equivalence ratio. This assures combustion at proper flow speed by dumping into a sudden expansion chamber. In the SFRJ, air alone is dumped into the sudden expansion region.

In the SFRJ, a recirculation zone is formed in the expansion region which becomes the flame holder. The correct range of fuel-to-air must be internally generated within the recirculation zone to achieve flame stabilization. Fuel is gasified and mixed inside the combustion chamber instead of being premixed with air. Additionally, the fuel-air mixture in the flame holding region is not necessarily at the stoichiometric composition.

The method of fuel addition is in turn dependent upon the combustion process. A turbulent flame transfers heat to the fuel surface (which constitutes the wall of the combustion chamber), causing fuel gasification. The turbulent flame is established between the fuel surface and the boundary layer.

Flame holding in a SFRJ occurs in the recirculation zone behind a rearward facing step or sudden expansion region just ahead of the fuel grain. Heat transfers to the fuel surface during the ignition phase and results in a gasified fuel being injected into the recirculation zone. Simultaneously, a small fraction of the air streaming through the injector becomes entrained and a stable flame is formed in the recirculation zone.

A current hypothesis regarding the flame holding mechanism is that stabilization is achieved when the local mixture ratio in the recirculation zone is within the lean and rich combustion limits of the fuel. For hydrocarbons, this range of stability generally lies between equivalence ratios ($\Phi$) of 0.5 and 1.5.

The limiting injection parameter is the dimensionless parameter $h/D_p$ or the $A_p/A_i$, where $h=\frac{1}{2}(D_p-D_i)$, $D_p$ = diameter of fuel port, $D_i$ = diameter of injector port, $A_p$ = area of fuel port, and $A_i$ = area of injection port. Many fuels of interest have $(h/D_p)$ critical above that which would be desired. This increases the injector pressure drop for fixed $D_p$ and air flow conditions since $\Delta P \sim D_i^4$, where $\Delta P$ = injector pressure drop.

Because of the continuing interest in reducing the $(h/D_p)$ critical of ramjet solid fuels, an attempt was made to get a lower value by indirect means. However, the fuel systems having lower critical $A_p/A_i$ have up to 6% lower theoretical performances due to their ammonium perchlorate (AP) and HYCAT (a ferrocene compound, burning rate accelerator made by United Technology Center) content. HYCAT is described in U.S. Pat. No. 3,864,178.

SUMMARY OF THE INVENTION

The present invention provides a method for reducing the critical injection parameter by using a low $h/D_p$ fuel within the wedge region, or head end, of the fuel port adjacent the injection port, and using a higher $h/D_p$ fuel for the majority of the solid fuel grain.

BRIEF DESCRIPTION OF THE DRAWING

The FIGURE represents a cross-sectional view of a part of the "stovepipe" of a solid fuel ramjet.

DESCRIPTION OF THE PREFERRED EMBODIMENT

Referring to the FIGURE, a cylindrical casing, or "stovepipe", 10 of a solid fuel ramjet (SFRJ) has a fuel port 12 of diameter $D_p$ and cross-sectional area $A_p$, and an injector port 14 of diameter $D_i=(D_p-2h)$ and cross-sectional area $A_i$. The critical injection parameter is defined as the ratio of the difference in radius of the fuel and injection ports of the diameter of the fuel port, $h/D_p$, or as the ratio of the cross-sectional areas of the fuel port to the injection port, $A_p/A_i$.

Air flowing through the injector port 14 detaches from the walls and reattaches at the point $X_r$. The region ahead of the point $X_r$, the recirculation zone, is characterized by a complex pattern of recirculating vortex flow. Downstream of the point $X_r$, a turbulent boundary layer develops. The reattachment point can be determined by a variety of methods (cold-flow visualization, heat transfer measurements, or regression rate profiles) and can be predicted analytically.

A sustainer fuel 16 lines the interior of the casing 10 to form the fuel port 12. A wedge fuel 18 replaces part of the sustainer fuel 16 within the recirculation zone (wedge region or head end), of the fuel port 12 adjacent the injection port 14. The sustainer fuel 16 forms the majority of the grain and is a higher $h/D_p$ fuel than the wedge fuel 18 which is a low $h/D_p$ fuel.

The thickness of the wedge fuel 18 must be sufficient so that when the wedge fuel is gone (completely burned), the sustainer fuel is above its critical $h/D_p$ or else it will extinguish.

As an example, grains of UTC-14,666, cast with 2.1 inches O.D. by 1.25 inches long as the wedge fuel, formed the head end of UTC-14,175 grains having an I.D. of 1.52 inches. Table I shows the results of tests using this system.

TABLE I

| Fuel (UTC) | Formulation | $(h/D_p)$crit | $(A_p/A_i)$crit | $P/P_o°$ |
|---|---|---|---|---|
| 14,175 | 25% CLPS, 75% HTPB | 0.145 | 2.00 | 1.00 |
| 14,666 | 10% AP, 1.5% HYCAT, 88.5% UTC 14,175 | 0.095 | 1.52 | 0.58 |
| 14,666 14,175 | Dual cast | 0.112 | 1.66 | 0.69 | where $\Delta P$ = injector pressure drop and $\Delta P_0$ = injector pressure drop without the wedge fuel for constant air flow and fuel port diameter; CLPS = cross-linked polystyrene; HTPB = hydroxy-terminated polybutadiene and AP = ammonium perchlorate.

This is not the limit of system $h/D_p$ reduction. This would be dependent upon finding low $h/D_p$ head end fuels.

The result of the implementation of the present invention is a reduced pressure drop in a SFRJ, with consequent higher allowable chamber pressure and higher performance.

What is claimed is:

1. A fuel system for reducing the critical injection parameter $h/D_p$ where $h = \frac{1}{2}(D_p - D_i)$, $D_i$ = diameter of fuel port, $D_p$ = diameter of fuel port in a solid fuel ramjet comprising:
   a sustainer fuel within a casing having a central aperture wherein the length of said casing forms a fuel port, and having a recirculation zone adjacent to an injector port within said casing; and
   a wedge fuel replacing part of said sustainer fuel in said recirculation zone having a low critical injection parameter $(h/D_p)$ and of sufficient thickness such that when said wedge fuel has been completely burned, said sustainer fuel is above its critical injection parameter to prevent extinguishment, the critical injection parameter $(h/D_p)$ of said sustainer fuel being higher than that of said wedge fuel.

2. A fuel system as recited in claim 1 wherein said sustainer fuel comprises:
   25% CLPS and 75% HTPB.

3. A fuel system as recited in claim 2 wherein said wedge fuel comprises:
   10%, AP, 1.5% ferrocene compound comprising a burning rate accelerator and 88.5% of said sustainer fuel.

4. A fuel system as recited in claim 3 wherein said sustainer fuel forms the majority of the grain of said fuel system.

5. A fuel system as recited in claim 4 wherein said casing comprises a cylindrical section.

6. A method for reducing the critical injection parameter $(h/D_p)$ where $h = \frac{1}{2}(D_p - D_i)$, $D_i$ = diameter of injection port, $D_p$ = diameter of fuel port, in a solid fuel ramjet having a casing with a sustainer region and recirculation zone at the head end of the sustainer region comprising the steps of:
   casting a grain having a first $h/D_p$ in the sustainer region; and
   casting a grain having a different lower $h/D_p$ in the recirculation zone at the head end of the sustainer region.

* * * * *